United States Patent [19]
Kuhn

[11] Patent Number: 6,023,765
[45] Date of Patent: Feb. 8, 2000

[54] IMPLEMENTATION OF ROLE-BASED ACCESS CONTROL IN MULTI-LEVEL SECURE SYSTEMS

[75] Inventor: D. Richard Kuhn, Columbia, Md.

[73] Assignee: The United States of America as represented by the Secretary of Commerce, Washington, D.C.

[21] Appl. No.: 08/975,159

[22] Filed: Nov. 20, 1997

Related U.S. Application Data

[60] Provisional application No. 60/032,531, Dec. 6, 1996.

[51] Int. Cl.[7] .............................. G06F 13/00; H04L 9/00
[52] U.S. Cl. ............................................. 713/200; 380/25
[58] Field of Search ..................... 713/200, 201, 713/202; 380/3, 4, 23, 25, 29; 707/104, 514, 103; 711/163; 395/728, 700, 800

[56] References Cited

U.S. PATENT DOCUMENTS

| | | | |
|---|---|---|---|
| 5,265,221 | 11/1993 | Miller ....................................... | 395/725 |
| 5,347,578 | 9/1994 | Duxbury ..................................... | 380/4 |
| 5,481,700 | 1/1996 | Thurailingham ......................... | 395/600 |
| 5,535,383 | 7/1996 | Gower ....................................... | 395/600 |
| 5,577,209 | 11/1996 | Boyle et al. ........................ | 395/200.06 |
| 5,680,452 | 10/1997 | Shanton ..................................... | 380/4 |
| 5,692,124 | 11/1997 | Holden et al. ...................... | 395/187.01 |
| 5,717,755 | 2/1998 | Shanton ..................................... | 380/25 |
| 5,724,426 | 3/1998 | Rosenow et al. .......................... | 380/25 |
| 5,828,832 | 10/1998 | Holden et al. ...................... | 395/187.01 |
| 5,832,228 | 11/1998 | Holden et al. ...................... | 395/200.55 |
| 5,836,011 | 11/1998 | Hambrick et al. ....................... | 395/208 |
| 5,848,232 | 12/1998 | Lermuzeaux et al. .............. | 395/187.01 |
| 5,859,966 | 1/1999 | Hayman et al. ......................... | 395/186 |
| 5,881,225 | 3/1999 | Worth ....................................... | 395/186 |
| 5,898,781 | 4/1999 | Shanton ..................................... | 380/25 |
| 5,911,143 | 6/1999 | Deinhart et al. ......................... | 707/103 |

FOREIGN PATENT DOCUMENTS 94112649  8/1994  European Pat. Off. .

OTHER PUBLICATIONS

Ferraiolo and Kuhn, "Role–Based Access Controls" Proc. 15th NIST–NSA National Computer Security Conference (1992).

*Primary Examiner*—Robert W. Beausoliel, Jr.
*Assistant Examiner*—Nadeem Iqbal
*Attorney, Agent, or Firm*—Michael De Angeli P.C.

[57] ABSTRACT

Role-based access control (RBAC) is implemented on an multi-level secure (MLS) system by establishing a relationship between privileges within the RBAC system and pairs of levels and compartments within the MLS system. The advantages provided by RBAC, that is, reducing the overall number of connections that must be maintained, and, for example, greatly simplifying the process required in response to a change of job status of individuals within an organization, are then realized without loss of the security provided by MLS.

A trusted interface function is developed to ensure that the RBAC rules permitting individuals access to objects are followed rigorously, and provides a proper mapping of the roles to corresponding pairs of levels and compartments. No other modifications are necessary. Access requests from subjects are mapped by the interface function to pairs of levels and compartments, after which access is controlled entirely by the rules of the MLS system.

6 Claims, 4 Drawing Sheets

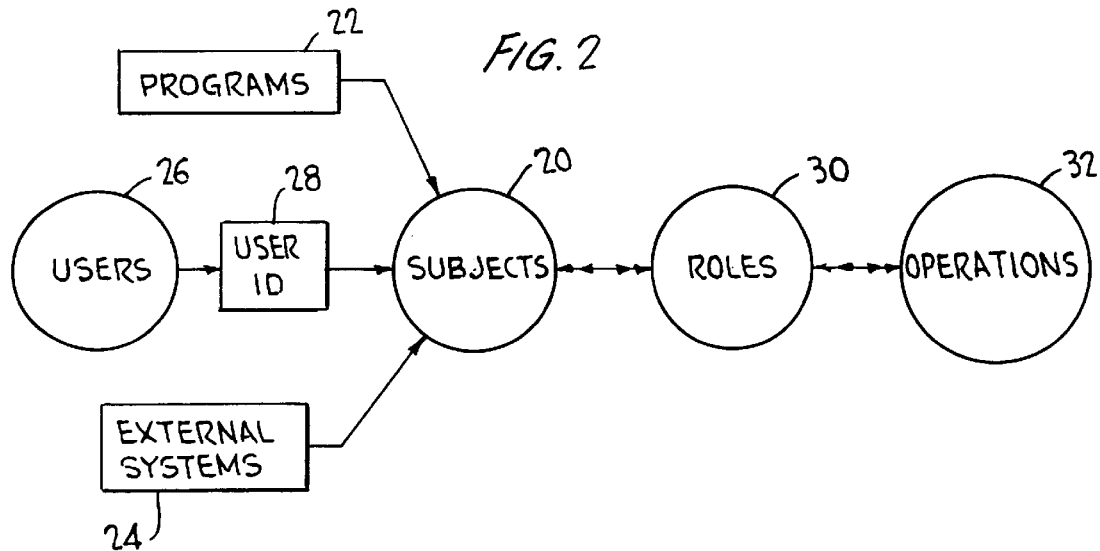
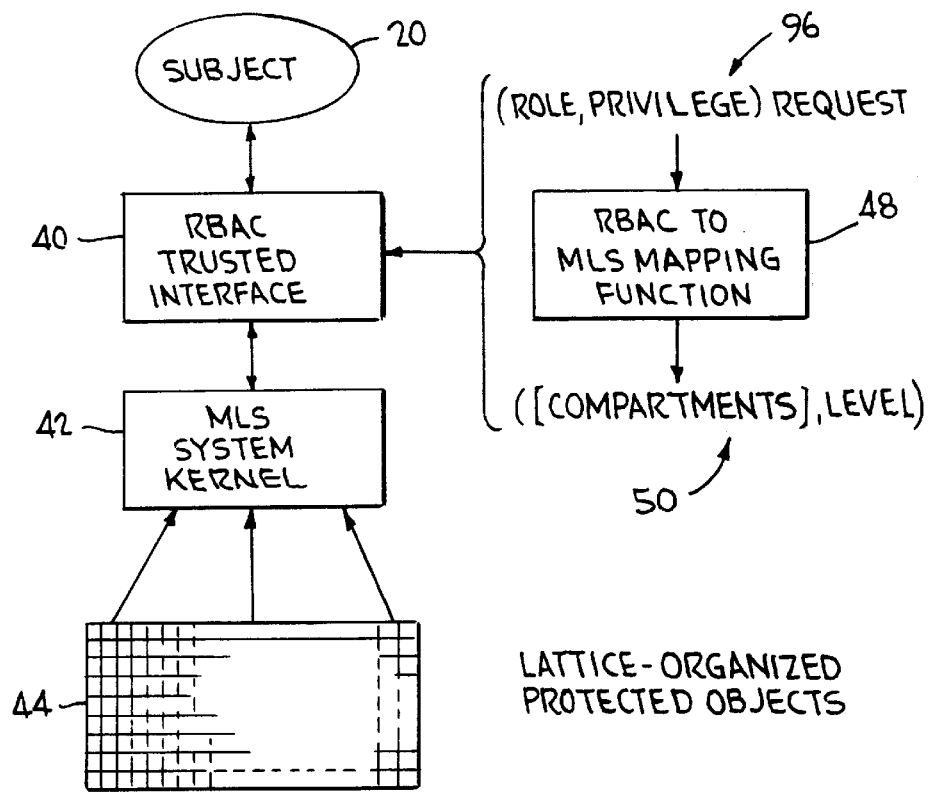

സ6,023,765

IMPLEMENTATION OF ROLE-BASED ACCESS CONTROL IN MULTI-LEVEL SECURE SYSTEMS

CROSS-REFERENCE TO RELATES APPLICATION

This application claims priority from Provisional Patent Application Ser. No. 60/032,531, filed Dec. 6, 1996.

FIELD OF THE INVENTION

The present invention relates to security in computer systems. More particularly, the invention relates to control of the access of users to objects protected by known lattice-based multi-level secure systems.

BACKGROUND OF THE INVENTION

1. Multi-level Secure (MLS) Systems

Traditionally, managing the security of a computer system has required mapping an organization's security policy to a relatively low-level set of controls, typically access control lists. That is, assuming individual persons are first identified to the system in a satisfactory manner, their access to documents, programs, facilities, and other "objects" within the protected computer system is then controlled by a security system simply by comparing the user's name against a list of names of persons entitled to access the given object.

According to a more sophisticated and very well-developed model for security of computer systems used widely throughout the U.S. military, and elsewhere, access to objects in a computer system is controlled by a "multi-level secure" ("MLS") system. A very significant investment has been made in development, verification, and implementation of such MLS systems. The present invention relates to a more convenient method of use of existing MLS systems than is now provided, but does not vitiate any of the security features provided by existing MLS systems; instead, the improvement provided by the present invention operates in conjunction with existing MLS systems. Accordingly, implementation of the present invention does not involve devaluation or modification of existing MLS systems, which would be very undesirable; not only would this be very costly, but the known security of existing MLS systems would no longer be available.

Existing MLS systems are referred to as "lattice-based" because objects to which access is controlled thereby may be thought of as located on a two-dimensional lattice, in which one dimension is a security level, such as SECRET, TOP SECRET, etc., and the other dimension is a grouping by subject matter or the like. See FIG. 1, depicting a schematic representation of an MLS lattice. Here, the vertical axis represents various levels 10 of security, while the horizontal axis represents objects 14 protected by the system, organized by categories 12. The categories may be subject-matter-related, e.g., Procurement, Personnel, or Public Relations, or may be organized by further security classifications, e.g., NATO, NOFORN (an acronym for "No Foreign Nationals"), or the like.

According to MLS, all objects are assigned one or more "compartments", which are simply lables used to index the objects. Access to the objects is then provided by giving the requester access to compartments including those of the objects requested and of a equal or lesser security level. Again assuming individual persons are first identified to the system in a satisfactory manner, a subject (again, an individual, another computer system, or the like) seeking access to an object (a document, a control path, a communication path, or the like) protected by the system must thus have been assigned access to the compartment within which the object is located and must possess a security clearance at least equal to that of the object. See generally, "Role-Based Access Controls", Ferraiolo et al, *Proceedings of the 15th NIST-NSA National Computer Security Conference,* 1992.

As a practical matter, implementation of the the MLS "kernel" as above requires that each user must be separately assigned numerous "privileges", i.e., the right to access certain objects or groups of objects within the system. In a large MLS system, with hundreds or thousands of users, and as many objects, maintenance of the proper "connections", that is, assignment of privileges with respect to various objects to individual users, is a substantial administrative burden. Particularly when an individual changes job assignments, all connections between that individual and objects to which he or she previously had access must be severed, and new connections must be established to all objects needed for performance of the new function.

As mentioned, however, there has been a very substantial investment made in MLS systems to date; they are tested, verified, and trusted, and so any new system attempting to simplify the use of MLS systems must as a first criterion not vitiate the security provided thereby.

2. Role-Based Access Control

Briefly stated, in role-based access control (RBAC) systems, access to an object within a computer system is provided to the members of groups termed "roles"; all subjects belonging to a given role have the same privileges to access various objects within the system. Individuals are then granted access to objects by being assigned membership in appropriate roles.

RBAC is considered useful in many commercial environments because it allows access to the computer system to be conveniently organized along lines corresponding to the actual duties and responsibilities of individuals within organizations. For example, RBAC allows the access provided by roles to conform to a preexisting heirarchy; in a hospital environment, members of the "doctor" role will have broader access to protected objects than would members of "nurse", who will in turn be given broader acceess than "health-care provider". Various types of privilege can be conveniently organized as a function of role assignments. For example, "doctor" membership may allow the user the privilege to read from or write to a pharmacy record, while "pharmacist" may only allow reading therefrom. Cardinality may be enforced; that is, only one general manager may exist at a given time. Roles may be exclusive; that is, an individual who is a member of "trader" in a commercial bank could not also be a member of "auditor" at the same time.

A particular advantage of RBAC is that it allows the access privileges provided to individuals to be very conveniently reconfigured as the individuals change job requirements, simply by deleting one's original assignment to a first role and adding one to the new role.

RBAC is described in Ferraiolo et al (1992), supra, and operational RBAC software is available from several vendors.

A rigorous mathematical basis for RBAC is provided by the inventor and others in Ferraiolo et al, "Role based access control: Features and motivations", *Annual Computer Security Applications Conference,* IEEE Computer Society Press, 1995. This paper, which is not prior art to the present invention, is incorporated herein by reference. See also Sandhu et al, "Proceedings of the First ACM Workshop on Role Based Access Control", ACM, 1996, also not prior art to the present invention.

Despite the existence of extensive literature on the subjects of both RBAC and MLS sytems, insofar as known to the inventor the prior art does not suggest application of RBAC to MLS systems without disturbance of the underlying MLS "kernel", which is essential if MLS's advantages, and the investment therein, are to be preserved.

Finally, also of general interest to the present invention is European Patent Application 94 112 649.2 (IBM), showing a hybrid RBAC system, wherein role assignments are apparently used to generate access control lists corresponding to objects. This application does not refer to MLS systems.

OBJECTS OF THE INVENTION

It is therefore an object of the invention to provide a method whereby access of individuals and subjects to objects controlled by an MLS system can be simplified using RBAC as an interface to the MLS system.

It is a further object of the invention to provide a method for employment of RBAC as an access method for MLS systems, without disturbance of the MLS kernel, thereby preserving the security advantages provided by MLS.

It is a further object of the invention to provide a method for employment of RBAC as an access method for MLS systems while simultaneously preserving the traditional methods of access to MLS, whereby objects protected by the MLS system can be accessed through RBAC or by traditional methods.

SUMMARY OF THE INVENTION

According to the invention, each role within an RBAC system is treated as a collection of permissions on privileges, that is, the right to access a set of objects. RBAC is implemented on an MLS system by establishing a mapping between privileges within the RBAC system and pairs of levels and sets of "compartments" assigned to objects within the MLS system. The advantages provided by RBAC, that is, reducing the overall number of connections that must be maintained, providing access to protected objects in a manner conveniently mirroring the organizational structure, and greatly simplifying the process required in response to a change of job status of individuals within an organization, are then realized without loss of the security provided by MLS.

To implement RBAC in an MLS environment, a trusted interface function is developed to ensure that the assignment of levels and sets of compartments to users is controlled according to the RBAC rules; that is, the trusted interface ensures that the RBAC rules permitting individuals membership in roles are followed rigorously, and provides a proper mapping of the roles to corresponding pairs of levels and sets of compartments. No other modifications are necessary. Access requests from subjects are first mapped by the interface function to the pairs of levels and sets of compartments available to the corresponding role, after which access to the objects is controlled entirely by the rules of the MLS system, responsive to the pairs of levels and sets of compartments assigned.

In essence, each user request for a privilege is checked to ensure that it is permitted to the subject's role at the time of the request. The trusted interface then sets the subject's compartments and levels according to a mapping function that determines a unique combination of compartments and levels for the privilege requested.

BRIEF DESCRIPTION OF THE DRAWINGS

The invention will be better understood if reference is made to the accompanying drawings, wherein:

FIG. 2 shows schematically the relation between subjects, roles, and operations according to the RBAC model;

FIG. 3 shows schematically the arrangement of RBAC as the access method employed with an MLS system;

DESCRIPTION OF THE PREFERRED EMBODIMENTS

Figure 1:
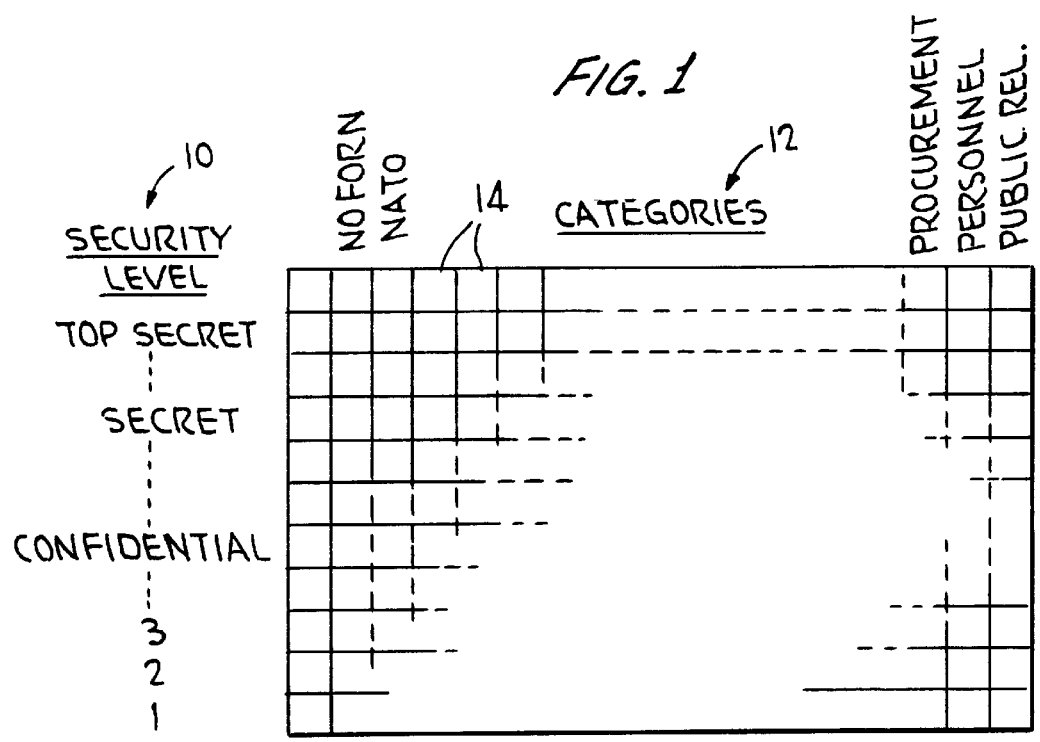
FIG. 1, as discussed above, shows schematically the assignment of objects protected by a MLS system to compartments and levels, thus forming a lattice.

Role based access control (RBAC) is offered as an alternative to traditional discretionary (DAC) and mandatory access control (MAC) systems for controlling access to computer systems; that is, RBAC is normally considered an alternative to access control list and "multi-level secure" ("MLS") systems, respectively. See the prior art Ferraiolo et al 1992 and non-prior art Sandhu 1996 papers discussed above. RBAC is attracting increasing attention, particularly for commercial applications.

The principal motivation behind RBAC is the desire to specify and enforce enterprise-specific security policies in a way that maps naturally to an organization's structure. Traditionally, managing security has required mapping an organization's security policy to a relatively low-level set of controls, typically access control lists.

With RBAC, security is managed at a level that corresponds closely to the organization's structure. Each user is assigned one or more "roles", and each "role" is assigned one or more "privileges" that are permitted to users in that role.

FIG. 2 shows schematically the organization of a conventional RBAC system. Subjects 20, which can include external programs 22, external systems 24, or individual users 26, who will normally be identified to the system through a conventional identification process 28, are assigned to roles 30. The subjects 20 can then perform operations 32 as assigned to the roles 30.

In this connections, "operations" includes "privileges", including the right to access objects within the protected system, such as stored documents, or to employ resources, or to perform certain "transactions". The operations provided for each role correspond to the duties and responsibilities of the persons having that role in the organization. For example, roles in a bank may include the role of teller or accountant. Each of these roles has a set of privileges or transactions that they can perform, including some privileges that are available to both roles. Roles can be hierarchical. For example, some roles in a hospital may be health care provider, nurse, and doctor. The doctor role may include all privileges available to the nurse role, which in turn includes all the privileges available to the health care provider role.

Roles have been used in a variety of forms for computer system security for at least 20 years, and various proposals for incorporating roles into existing access control mechanisms have been published. More recently, formal definitions for general-purpose RBAC notions have been proposed. See the prior art Ferraiolo et al 1992 paper referred to above, as well as the non-prior art Ferraiolo et al 1995 and Sandhu et al 1996 papera also referred to above.

The present invention relates to methods for implementation of RBAC as an access method for use with traditional lattice-based multi-level secure systems, in particular, to provide the convenience and organizational tracking of RBAC while incorporating the proven security of MLS systems.

The inventive approach presents a number of advantages:

1) Many firms have spent hundreds of millions of dollars building, testing, and maintaining MLS systems. By implementing RBAC using a single trusted process, this investment can be leveraged to produce new systems that have great commercial value without requiring a similarly large investment to build entirely new RBAC systems.

2) The process of "assurance" (i.e., testing) for trusted systems is lengthy and expensive. By confining RBAC to a single trusted process that sits above the MLS kernel (that is, becomes the input to MLS, and thus does not affect the proven MLS access method), the assurance process is much less expensive than that required for an entirely new system.

3) Operating RBAC and MLS security simultaneously on a system, for example, such that only certain objects can be accessed via RBAC, may be much simpler and easier to analyze for assurance purposes.

The following provides the formal mathematical definition for RBAC, as set forth in the prior art Ferraiolo et al 1992 and non-prior art Ferraiolo 1995 papers referred to above.

Variables used are shown with their types below:

s: subject i,j: role p: privilege o: object u: user

The following definitions are used:

Subjects:

U[s]=the user u associated with subject s

R[s]=the set of roles for which subject s is authorized

A[s]=the current list of active roles for subject s

Roles:

M[i]=the users authorized for role i

O[i]=the privileges that are authorized for role i

E=the set of role pairs (ij) that are mutually exclusive with each other

Access to privileges:

X[s,p]=true if and only if subject s can execute privilege p

Equation (1) below is referred to as the consistent subject axiom and relates human users to subjects executing on the users' behalf. Eq. (1) states, in effect, that human users are authorized to execute privileges assigned to a role only if they belong to the class of subjects authorized for that role.

(The form of Eq. (1) shown below is revised slightly from that in the Ferraiolo et al 1992 paper.)

$$\forall s, u, i \mid U[s] = u : u \in M[i] \Leftrightarrow i \in R[s] \qquad (1)$$

Equation (2) refers to role assignment: a subject can execute a privilege only if the subject has been selected or been assigned an active role.

$$\forall s, p : X[s, p] \Rightarrow A[s] \neq 0 \qquad (2)$$

Equation (3) refers to role authorization: a subject's active role must be authorized for the subject.

$$\forall s : i \in A[s] \Rightarrow i \in R[s] \qquad (3)$$

Equation (4) refers to privilege authorization: a subject can execute a privilege only if the privilege is authorized for a role in which the subject is currently active.

$$\forall s, p \mid \exists i : X[s, p] \Rightarrow i \in A[s] \land p \in O[i] \qquad (4)$$

With Eqs. (2) and (3), the rule expressed by Eq. (4) guarantees that a subject can execute a privilege only if the privilege is authorized for that active role.

Equation (5) relates to role hierarchy: Roles are organized into a partially ordered set (poset) so that if a role is included in a set S, roles below it in the poset are included also:

$$\forall i, j : i \in S \land i \geq j \Rightarrow j \in S \qquad (5)$$

According to the present invention, RBAC is implemented directly on multi-level secure (MLS) systems that support the traditional lattice based controls. This is significant because it means the enormous investment in MLS systems can be applied to implementing RBAC systems. Two methods of accomplishing this are described. The first method can handle a total of c RBAC privileges, where c is the number of compartments supported on the MLS system. The second method makes it possible to control access to $2^{min(c,l)}-1$, where l is the number of clearance levels on the MLS system.

The basic features of MLS were described above. To recapitulate briefly, in MLS {level, compartment} pairs are assigned to objects; a user must have a security clearance level at least equal to the assigned level, and be permitted access to the compartment(s) of the object, before access will be permitted by the MLS kernel.

More rigorously, MLS access controls make use of a set of labels attached to subjects and objects. The labels define a set of security "levels", such as CONFIDENTIAL, SECRET, TOP SECRET, and a set of "compartments", which may be arbitrary, may relate to subject matter areas or individual projects, or be more general, such as NATO, or NOFORN. Conventional MLS systems implement the military security policy defined by Bell and LaPadula, "Secure Computer Systems: Mathematical Foundations and Model", Technical Report M74-244, Mitre Corp., 1973.

In the following, a standard set of features and functions for an MLS system is assumed, such as those described in Gasser, "Building a Secure Computer System", Van Nostrand Reinhold, 1988, or Pfleeger,"Security in Computing", Prentice Hall, 1989. As set forth therein, the MLS system is assumed to maintain the following sets of labels:

L=an ordered set of security clearance levels;
C=a set of compartment names.

Each subject s (including individual users as well as other computers, programs and the like, as above) has the following sets of labels:

$C_s$=set of compartment names authorized for use by subject s.

$A_s$=sets of active compartment names selected by subject s.

Finally, a set of compartment names $C_o$ is associated with each object o.

The levels L and compartments C are labels for subjects s and objects o. The labels form a lattice where the partial order relation is defined as follows:

$$s \geq 0 \Leftrightarrow l_s \geq l_o \wedge c_o \subseteq c_s \qquad (6)$$

Those of skill in the art will recognize that according to this rule, access by a subject with rights s to an object o is permitted if and only if s≧o; that is, a user can access only those objects within compartments to which the user has been granted access, and can only access those objects therein having security levels equal to or less than his or her own clearance level.

In order to implement RBAC within an MLS system according to the invention, each role within an RBAC system is treated as a collection of permissions on privileges, that is, the right to access a set of objects protected by the MLS system. RBAC can then be implemented on an MLS system by establishing a relationship between privileges within the RBAC system and pairs of levels and compartments within the MLS system. The advantages provided by RBAC, that is, reducing the overall number of connections that must be maintained, and, for example, greatly simplifying the process required in response to a change of job status of individuals within an organization, are then realized within the MLS system, without loss of the security provided by MLS.

Since a lattice is induced by partitioning the set of roles into subsets, the lattice structure used by the MLS system is sufficient to represent the RBAC privilege structure.

To implement RBAC in an MLS environment, a trusted interface function is developed to ensure that the assignment of levels and compartments to users is controlled according to the RBAC rules; that is, the trusted interface (1) ensures that the RBAC rules permitting individuals access to objects are followed rigorously, and (2) provides a proper mapping of the roles to corresponding pairs of levels and compartments. No other modifications are necessary. Access requests from subjects are mapped by the interface function to pairs of levels and compartments, after which access is controlled entirely by the rules of the MLS system.

The trusted interface operates according to the rules for RBAC, e.g., as specified in Ferraiolo et al (1992), referred to above. In essence, each user request for a privilege is checked to ensure that it is permitted to the subject's role at the time of the request. The trusted interface then sets the subject's compartments and levels according to a mapping function that determines a unique combination of compartments and levels for the privilege requested.

FIG. 3 shows schematically the use of RBAC as the access method to an existing MLS system. Subjects 20 access protected objects 44, organized by MLS into a lattice, via the RBAC trusted interface 40 and the usual MLS system kernel 42. More specifically, as illustrated on the right side of FIG. 3, when a subject makes a request 46 for a privilege, the trusted interface 40 first confirms that the subject is a member of a role entitled to that privilege, using the definitions provided above, and only then provides the proper mapping function 48 between the requested privilege and the proper {compartment, level} pair within the MLS lattice.

Choice of the proper mapping function is important to fully realizing the advantages of the invention. An obvious possibility is the one-to-one assignment of MLS compartments to RBAC privileges. For small numbers of privileges, this is an efficient solution. Users can simply be assigned a set of compartments that correspond to the privileges of their roles, then access is handled by the MLS system. This method is described in Meyers, "Rbac emulation on trusted dg/ux", *Proceedings of the Second ACM Workshop on Role Based Access Control*, 1997.

Unfortunately, most MLS systems support a relatively small number of compartments and levels, typically 64 to 128 of each. Obviously, if the MLS system were testing that $l_s \geq l_o \wedge c_o = c_s$, rather than $l_s \geq l_o \wedge c_o \subseteq c_s$, then we could simply use subsets of compartments to map to privileges, giving a total of $2^c$ mappings. However, since we want to be able to control access to RBAC privileges simultaneously with MLS access control without changing the underlying "kernel" of the MLS system, we need a method can uniquely represent a large number of privileges using MLS compartments and levels.

According to an important aspect of the invention, there are several alternative functions that can be used to map between roles and clearances. According to a first method, it is possible to support a total of $2^{min(c,l)}-1$ privilege mappings, where c is the number of compartment labels used on the MLS system and l is the number of clearance levels. Using 64 compartments and 64 levels, a total of $1.8 \times 10^{19}$ privilege mappings could be provided, more than sufficient for any enterprise.

According to this first alternative, we establish a mapping between RBAC privileges and pairs of MLS compartments. This approach would support a total of $(n^2-n)/2$ privilege mappings. If 64 compartments are available on the MLS system, then 2,016 privileges could be mapped to MLS compartments. This is a more reasonable number, but large organizations may require many more individual privileges to be controlled, particularly if there is to be at least one unique privilege for each user in the organization. Also, in some applications only a very small number of compartments may be available; if only 10 compartments were available, then only 45 privileges could be controlled in this manner.

A more generalized approach, which is preferred, is to map roles to combinations of compartments. For c compartments, the largest number of privileges that can be controlled is $$\binom{c}{c/2}$$

With 64 compartments, this would be $1.83 \times 10^{17}$. But if only a few compartments are available, this approach may not be adequate. For example, with 10 compartments, only 252 privileges could be controlled.

Rather than mapping between privileges and compartments, we will develop a mapping between privileges and pairs <C,l>, where C is a set of compartments and l is a level. The procedure is as follows:

(1) Privileges are numbered sequentially, but the ordering can be arbitrary.

(2) Compartments are numbered sequentially from 1 to c, where c is the number of compartments available for use by the mapping function. For many applications it will be desirable to use only a subset of the total compartments available on the MLS system. Typically the privileges being controlled by the RBAC system will be operations or transactions. Some compartments that are not directly accessible to human users may be reserved for use by operations or transactions. Alternatively, the RBAC access control may be run concurrently with traditional information-flow access control on the MLS system, so that a user may log in as either an MLS user or an RBAC user (but not both simultaneously).

Figure 4:
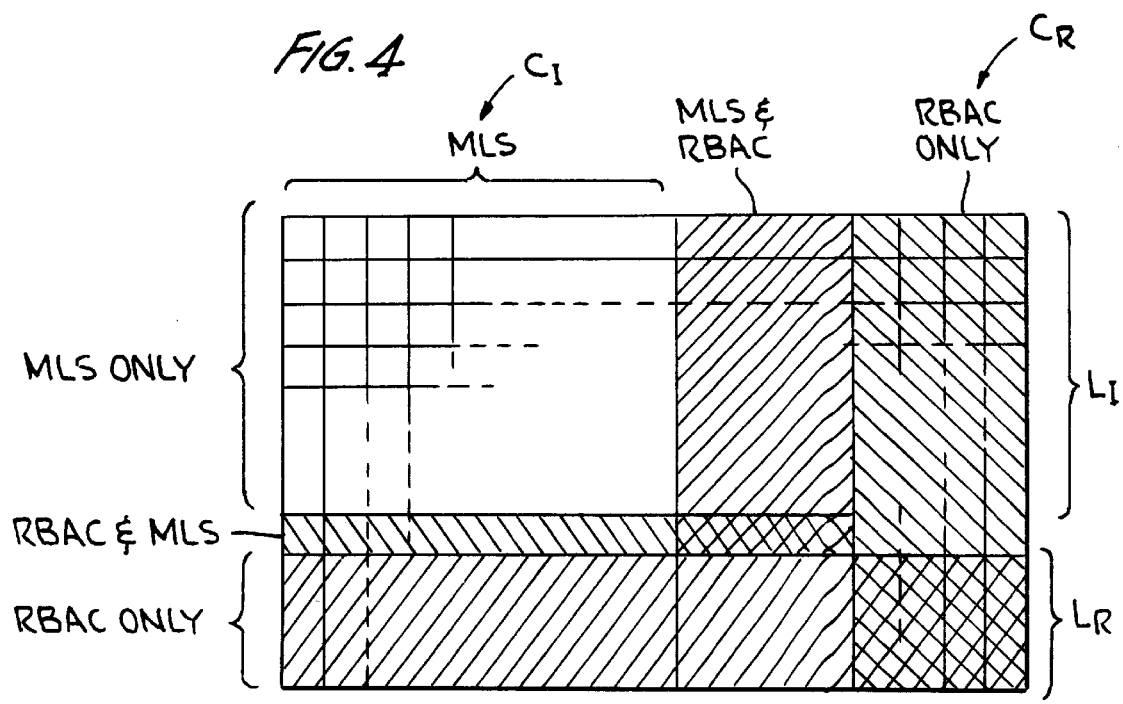
FIG. 4 shows a diagram similar to that of FIG. 1, and additionally illustrates the manner in which objects protected by an MLS system can be accessed through the RBAC interface, accessed as previously provided, or both.

(3) If it is desired to to provide RBAC and information-flow security on the same system, we split the set of compartments C into two sets: $C_R$, the compartments to which RBAC-controlled operation names are mapped, and $C_I$, the compartment names used by the information-flow policy, where $C_R \cup C_I = 0$. See FIG. 4, illustrating the partitioning of the MLS lattice in this manner. As showm, some compartments might also be accessible through RBAC or the information-flow policy.

(4) Similarly, it may be desirable to distinguish two sets of levels $L_R = l_{R0} \ldots l_{Rm}$, the levels to which RBAC-controlled operation names are mapped, and $L_I = l_{I0} \ldots l_{In}$, the level names used by the information-flow policy. We require that $l_{I0} > l_{Rm}$ making objects controlled by the information-flow policy inaccessible to RBAC users. RBAC objects are inaccessible to non-RBAC users because the compartment names do not overlap. Again, see FIG. 4, also illustrating the possibility that some levels are accessible via both the information-flow policy and RBAC.

(5) For each privilege p, assign a set of compartments $C_p$ and a level $l_p$. Let $x_c \ldots x_1$ be the binary representation of the privilege number. Then $$C_p = \bigcup_{j | x_j = 1} c_j \quad (7)$$

and $$l_p = c - \sum_{j=1,c} x_j. \quad (8)$$

The trusted interface—that is, software provided between the RBAC and MLS systems, and provided according to the invention—can now mediate a user's access to role privileges $p_i$ by assigning to the user compartments $C_{Pi}$ and level $l_{Pi}$, where $C_{Pi}$ is the set of compartments corresponding to $p_i$ and $l_{Pi}$ is the level of $p_i$. It can be shown that this procedure ensures a one-to-one mapping between RBAC privileges and pairs of compartments and levels.

To see how the procedure works, consider as an example a set of privileges $p_1 \ldots p_7$. The MLS system supports three compartments, $c_1, c_2, c_3$, and three levels. The privileges and associated compartments and levels are as shown in Table 1.

TABLE 1

| Privilege p | Binary $x_3 x_2 x_1$ | Compartments $C_p = U_j|_{xj=1} c_j$ | Level $l_p = c - \Sigma_{j-1,c} x_j$ |
|---|---|---|---|
| 1 | 001 | $c_1$ | 2 |
| 2 | 010 | $c_2$ | 2 |
| 3 | 011 | $c_{2, c1}$ | 1 |
| 4 | 100 | $c_3$ | 2 |
| 5 | 101 | $c_{3, c1}$ | 1 |
| 6 | 110 | $c_{3, c2}$ | 1 |
| 7 | 111 | $c_{3, c2, c1}$ | 0 |

As objects are added to the system, they are assigned sequential numbers $p_i$, and the one-valued bits of the binary representations thereof are used to define compartments to which the object belongs; that is, a subject must be permitted access to all of the compartments to which the object is thus assigned before access will be permitted. The newly-assigned compartments are then added to those accessible by subjects belonging to the appropriate roles, and an appropriate security level is assigned. These assignments are typically made by a system administrator, i.e., a person having responsibilities equivalent to properly assigning objects to positions within a lattice in an MLS system.

When a subject thereafter requests privilege $p_i$, the trusted interface checks that $p_i$ is allowed by the subject's current role, and, if so, then assigns the subject the set of compartments and the level corresponding to $p_i$. For example, suppose the subject requests $p_5$. The trusted interface assigns the subject compartments $c_3, c_1$ and level 1. From this point on, the subject's access is mediated by the MLS kernel, as normally provided.

To see that the subject can access only privilege $p_5$, consider the privileges numbered below and above 5. No privilege with more than 2 bits in its binary representation can be accessed, because at least one more compartment is required. No privilege with one bit in its binary representation can be accessed, because its level would be 3−1=2, which is above the subject's assigned level of 1, and the MLS rule requires that $l_s \geq l_o$. Now consider the privileges with 2 bits in their binary representation privileges 3 and 6. Both of these have compartment 2 in their binary representations, which privilege 5 does not have. Therefore the subject cannot access these, because the MLS rule requires $c_o \subseteq c_s$.

The above describes mapping from roles to {compartment, level} sets dynamically, in response to a request from a subject. RBAC may also be implemented at system initialization time, in a generally similar manner. Implementing RBAC by mapping from roles to compartments at system initialization time, rather than dynamically during requests for privilege execution, provides two significant advantages over the dynamic mapping method from the previous section.

1) By establishing a static mapping the trusted interface does not need to translate each user request into a <level, compartment-set> pair for each request. System overhead is thus reduced because the RBAC software is needed only when a user logs into the system to establish a session.

2) Only compartment sets are used; security levels are not needed to control access to RBAC-protected objects. This makes it possible to use RBAC simultaneously with the information-flow policies supported on MLS systems.

Let $R_o$ be a tree of roles and associated privileges, where the root represents one or more privileges that are available to all roles in the system. Child nodes represent more specialized privilege sets. A child node $R_j$ can access all privileges associated with role $R_j$ and any associated with roles $R_i$, where the $R_i$ are any ancestor nodes of $R_j$. The privilege sets are assumed to be disjoint. If roles exist with overlapping privilege sets, then new roles can be created including the common privileges, and existing roles can inherit from them. For example, if $R_i$ and $R_j$ have privilege sets $P(R_i)$ and $P(R_j)$ that overlap, then the access method can 1. create a new role $R_k$ with privilege set $P(R_i) \cap P(R_j)$;
2. remove privileges in $P(R_i) \cap P(R_j)$ from $P(R_i)$ and $P(R_j)$; and
3. modify the role hierarchy so that $R_i$ and $R_j$ inherit from $R_k$, and $R_k$ inherits from the roles from which $R_i$ and $R_j$ previously inherited.

If we let

C=total number of compartments on the MLS system to be used to implement RBAC;

d=maximum depth of child nodes from the root, where the root is level 0, i.e., d is equivalent to the maximum level of the leaf nodes; and if the tree is relatively balanced, then $\lfloor C/d \rfloor$ compartments (that is, the integral value of C/d) are available at each level for representing privilege sets.

To distinguish between privilege sets, combinations of compartments are used. At each level in the tree, where n is the number of compartments available for representing roles at that level, the number of privilege sets that can be distinguished is $$\binom{n}{\lfloor n/2 \rfloor}$$

Privilege sets may be associated with compartments as follows:

1. A role at the root of the tree, with privileges available to all users, is associated with a randomly selected compartment. This compartment is removed from the set of compartments available to designate roles.

2. Roles at level 1 of the tree, where $n_l$ indicates the number of nodes at level 1, are associated with unique sets of compartments drawn from the set of remaining compartments. The number of compartments needed for level 1 is the smallest number c such that $$n_l \leq \binom{c}{\lfloor c/2 \rfloor}$$

Choose c compartments from the remaining set of compartments. Remove these c compartments from the set of compartments available to designate roles.

3. From the set of compartments chosen in step 2, assign a unique set of compartments to each privilege set at level 1. Step 2 ensures that there are enough compartments to make all the sets different.

One way of implementing this step is to generate a list $L_1$ of numbers from 1 to $2^c-1$, then extract from this list a second list $L_2$ containing all numbers whose binary representation contains $\lfloor C/2 \rfloor$ bits. Each bit is associated with a compartment. Assign to each privilege set at level 1 a different number from $L_2$. Then label each privilege in a privilege set with compartment i if and only if bit i in the binary representation is a 1. For example, the mapping from bits to compartments in Table 1 shows how the procedure works for c=3 compartments. Extracting all sets of two compartments from the list (for example) gives $\{c_2, c_1\}$, $\{c_3, c_1\}$, $\{c_3, c_2\}$. Because all of the numbers associated with privilege sets have $\lfloor C/2 \rfloor$ bits, each privilege set will be labeled with a different set of compartments.

4. Label each privilege in each privilege set with the compartments assigned to the privilege sets above it in the tree, i.e., the inherited privileges.

5. Repeat steps 2 through 4 until all privilege sets have been assigned a set of compartments.

Each role must be able to access all privileges associated with its privilege set and all privilege sets associated with roles that it inherits, i.e., roles that are represented by ancestor nodes in the role hierarchy. Compartments may be assigned to roles as follows:

1. Assign to role $R_i$ the set of compartments assigned to its privilege set.

2. For each ancestor role $R_j$ from which role $R_i$ inherits privileges, assign the compartments associated with the privilege set for $R_j$.

MLS systems typically provide 64 to 128 compartments for labeling privileges. The implementation of RBAC on an MLS system described by the non-prior art Meyers paper referred to above assigns one bit to each role, providing a capability for controlling access for 128 roles. This is inadequate for any real application. By comparison, the construction described in the previous section will provide the capability for $$\left( \frac{\lfloor C/d \rfloor}{\lfloor C/2d \rfloor} \right)^d$$

roles. Tables 2 and 3 show the number of roles that can be controlled for various combinations of depth and breadth (branching factor) of role hierarchies.

TABLE 2

Number of Roles Supported with 64 Compartments

| Depth | Max. Branching Factor | Max. Roles |
|---|---|---|
| 5 | 924 | $6 \times 10^{14}$ |
| 10 | 20 | $1 \times 10^{13}$ |
| 15 | 6 | $4.7 \times 10^{10}$ |
| 20 | 3 | $3.4 \times 10^{9}$ |

TABLE 3

Number of Roles Supported with 128 Compartments

| Depth | Max. Branching Factor | Max. Roles |
|---|---|---|
| 5 | 5,200,300 | $3.8 \times 10^{33}$ |
| 10 | 924 | $4.5 \times 10^{29}$ |
| 15 | 70 | $4.7 \times 10^{27}$ |
| 20 | 20 | $1.0 \times 10^{26}$ |
| 25 | 10 | $1.0 \times 10^{25}$ |
| 30 | 6 | $2.2 \times 10^{23}$ |
| 40 | 3 | $1.2 \times 10^{19}$ |

Figure 5:
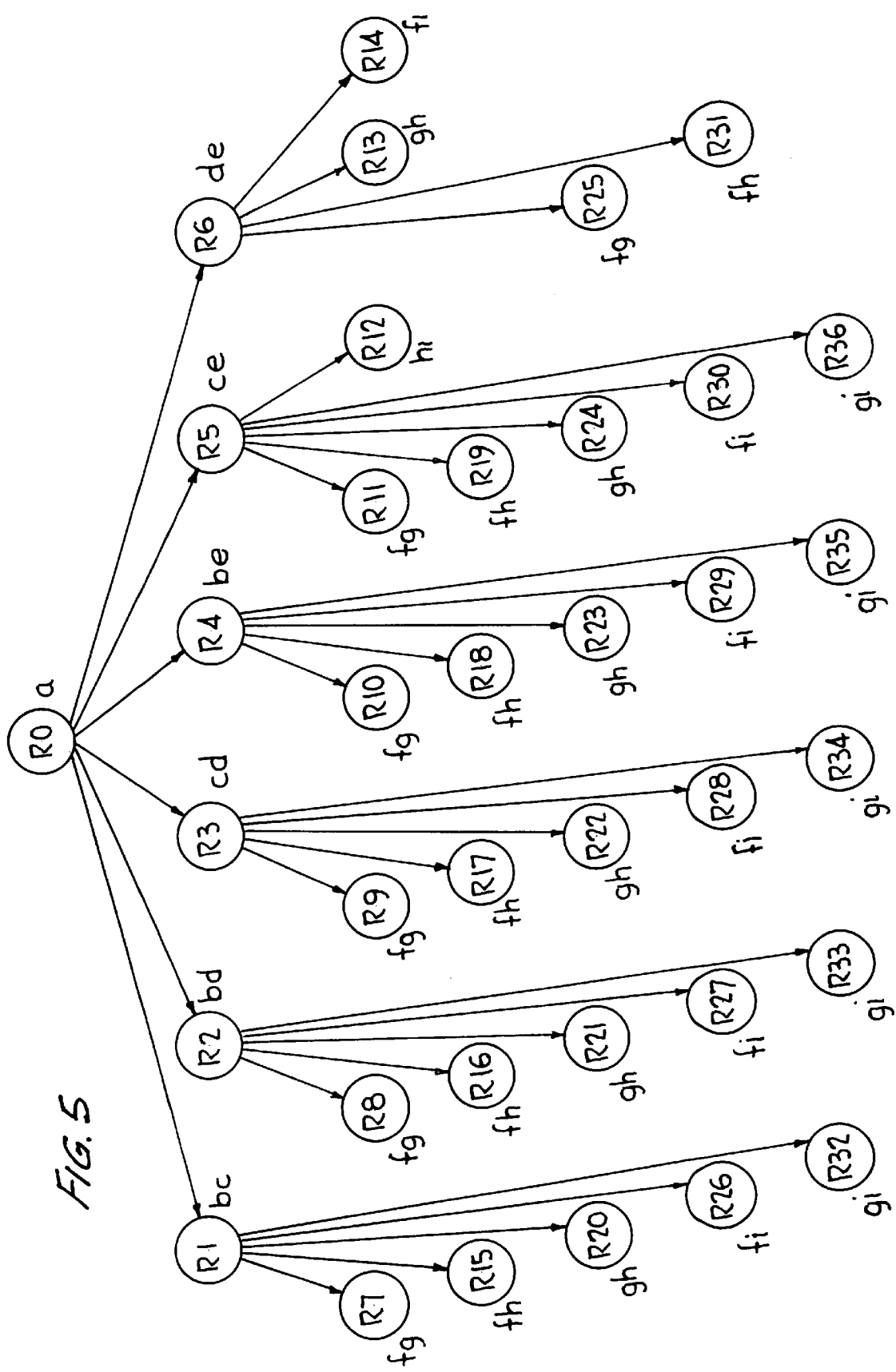
FIG. 5 shows an example of compartment labeling for a heirarchical privilege set.
Figure 6:
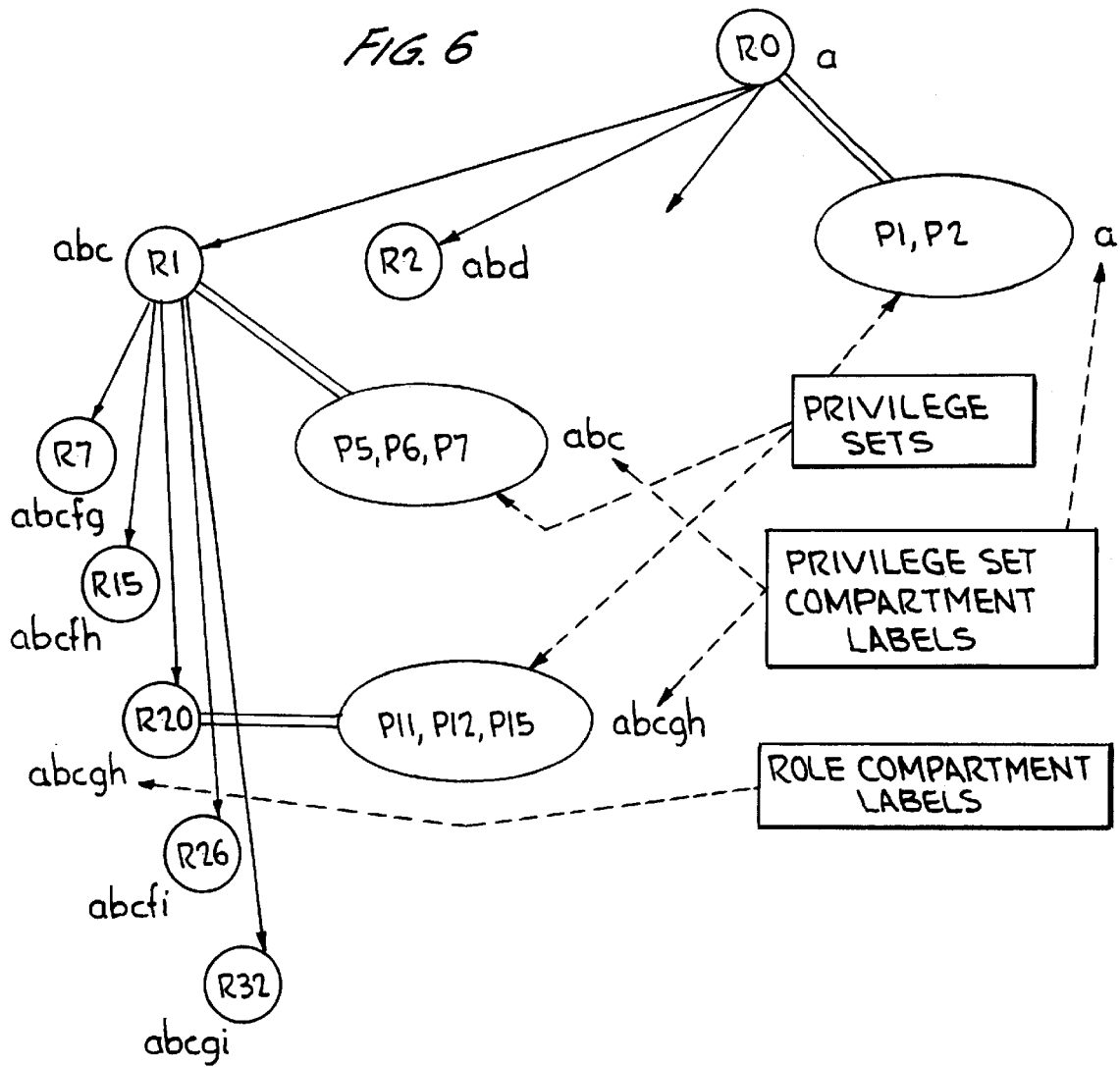
FIG. 6 shows an enlarged portion of FIG. 2, with privilege sets associated with various roles.

FIGS. 5 and 6 provide an example of compartment labeling for a hierarchical privilege set defining 36 roles. The tree shown in FIG. 5 has a depth of 2 and a maximum branching factor of 6. A total of 9 compartments a,b, . . . i are needed. The privilege sets assigned to a role are those labeling the role's node in the tree, plus the labels of any ancestor nodes. For example, role $R_{33}$ has compartments a, b, d, g, and i.

Consider roles $R_0$, $R_1$, and $R_{20}$. Privileges authorized for role $R_0$ are assigned compartment a. Privileges authorized for role $R_1$ are assigned compartments a, b, and c (a from role $R_0$ and b and c from role $R_1$). Privileges authorized for role $R_{20}$ are assigned compartments a, b, c, g, and h (a from role $R_0$; b and c from role $R_1$; and g and h from role $R_{20}$). A user who establishes a session at role $R_1$ will be assigned compartments a, b, and c. Note that this user can access the privileges assigned to role $R_0$ because the user has compartment a. A user who establishes a session at role $R_{20}$ will be assigned compartments a, b, c, g, and h. This user can access all inherited privileges, but not any other privilege sets, because all others have at least one compartment not assigned to role $R_{20}$.

FIG. 6 shows a portion of FIG. 5, with exemplary privilege sets associated with various roles. Each of the privileges $P_1$ and $P_2$ associated with role $R_o$ is labeled with compartment a. Therefore any user authorized for role $R_o$, or any role that inherits privileges from $R_o$ (e.g. $R_1$, $R_7$, etc.), can access privileges $P_1$ and $P_2$. Note that a user authorized only for $R_o$ cannot access privileges such as $P_5$, $P_6$, $P_7$, because these are labeled with compartments a, b, and c, while $R_o$ has only compartment a. A user authorized for role $R_1$, or any role that inherits from $R_1$, can access $P_5$, $P_6$, $P_7$, because $R_1$ has compartments a, b, and c.

It will be apparent to those of skill in the art that for reasons of both cost and trust, it is desirable to build RBAC systems on a proven MLS operating system. From a cost standpoint, it will normally be much easier to build RBAC as a single trusted process, provide a trusted interface between RBAC and MLS to provide the mapping functions described above, and then rely on MLS to control access to objects, than to modify the kernel of a secure system or build a new one from the ground up. Trust and assurance may be even more important considerations. The assurance process for a secure computing system is lengthy and expensive. MLS systems on the market today have had extensive evaluations and years of use in the field, largely by military organizations. The addition of RBAC to these systems can make them much more useful for commercial applications. The method of the invention makes it possible to leverage the large investment in these systems to produce RBAC systems that are in demand for commercial use.

While a preferred embodiment of the invention has been described, it will be appreciated by those of skill in the art that further enhancements and modifications thereto are possible, specifically in connection with the assignment of compartments and levels to objects to be accessed via the RBAC interface. Many additional mapping schemes beyond those discussed above are within the scope of the invention. Accordingly, these and other modifications to the preferred embodiment disclosed herein are intended to be within the scope of the following claims where not specifically excluded thereby.

What is claimed is:

1. In a lattice-based multi-level security system of the type wherein each object to which access is controlled by said lattice-based multi-level security system is assigned to a compartment and level maintained thereby, and wherein individual subjects are permitted access to specified objects protected by said security system only if the particular subject possesses a clearance level at least equal to that assigned to the object, and if the object is assigned to a compartment authorized for use by the subject, a method of implementing role-based access control, comprising the following steps:

defining a collection of roles, mapping each defined role to a set of privileges, each privilege providing access to one or more combinations of compartments and levels within said lattice-based multi-level security system, assigning each subject to one or more of said roles, and at the time a subject requests access to an object, determining whether the subject is assigned to a role having privileges corresponding to the compartment and level of the requested object within said lattice-based multi-level security system, and employing said lattice-based multi-level security system to control access of the subject to the object in response to said determination.

2. The method of claim 1, wherein said step of determining whether the subject is assigned to a role having privileges corresponding to the compartment and level of the requested object within said lattice-based multi-level security system is performed by:

(1) determining the compartment and level of the requested object within said lattice-based multi-level security system, (2) determining whether the subject belongs to a role mapped to a privilege providing access to the compartment and level of the requested object, and, if so, (3) assigning the subject access to objects having compartments and levels equal to those of the requested object.

3. The method of claim 1, comprising the further step of dividing the totality of compartments within said lattice-based multi-level security system into a first set of compartments that may be mapped to one or more of said collection of roles, and a second set of compartments that can not thus be mapped.

4. The method of claim 1, comprising the further step of dividing the totality of levels supported by said lattice-based multi-level security system into a first set of levels that may be mapped to one or more of said collection of roles, and a second set of levels that can not thus be mapped.

5. The method of claim 1, wherein as a new object is made available for access by said role-based access control method, said object is assigned to one or more compartments and levels within said lattice-based multi-level security system, and privileges providing access to said assigned compartments and levels are added to the set of privileges mapped to one or more of the defined roles.

6. The method of claim 1, wherein said step of determining whether the subject is assigned to a role having privileges corresponding to the compartment and level of the requested object within said lattice-based multi-level security system is performed by:

assigning each defined role in a group of roles to a heirarchical tree, wherein a root role $R_0$ represents one or more privileges available to all roles in the group, and child nodes $R_j$ can access all privileges associated with role $R_j$ and any associated with roles $R_i$, where roles $R_i$ are any ancestor nodes of $R_j$;

associating roles at level l of the tree, where $n_l$ indicates the number of nodes at level l, with unique sets of compartments drawn from the set of remaining compartments;

choosing c compartments from the remaining set of compartments and removing these c compartments from the set of compartments available to designate roles; and assigning a unique set of compartments to each privilege set at level l from the set of c compartments chosen.

* * * * *